(12) United States Patent
Toshinskiy et al.

(10) Patent No.: US 12,224,074 B2
(45) Date of Patent: Feb. 11, 2025

(54) NUCLEAR REACTOR USING NATURAL AND ARTIFICIAL CIRCULATION METHODS

(71) Applicant: JOINT STOCK COMPANY "AKME-ENGINEERING", Moscow (RU)

(72) Inventors: Georgiy Iliich Toshinskiy, Obninsk (RU); Oleg Gennad'evich Komlev, Obninsk (RU); Aleksandr Vladislavovich Dedul', Podolsk (RU); Sergey Aleksandrovich Grigor'Ev, Moscow (RU); Yuriy Viktorovich Oshejko, Obninsk (RU); Ivan Vladimirovich Tormyshev, Obninsk (RU)

(73) Assignee: JOINT STOCK COMPANY "AKME-ENGINEERING", Moscow (RU)

( * ) Notice: Subject to any disclaimer, the term of this patent is extended or adjusted under 35 U.S.C. 154(b) by 211 days.

(21) Appl. No.: 17/785,224

(22) PCT Filed: Dec. 18, 2020

(86) PCT No.: PCT/RU2020/000729
§ 371 (c)(1),
(2) Date: Jun. 14, 2022

(87) PCT Pub. No.: WO2021/137728
PCT Pub. Date: Jul. 8, 2021

(65) Prior Publication Data
US 2023/0017037 A1 Jan. 19, 2023

(30) Foreign Application Priority Data
Dec. 31, 2019 (RU) .......................... RU2019145363

(51) Int. Cl.
*G21C 1/32* (2006.01)
*G21C 15/02* (2006.01)
(Continued)

(52) U.S. Cl.
CPC ............. *G21C 1/326* (2013.01); *G21C 1/322* (2013.01); *G21C 15/02* (2013.01); *G21C 15/14* (2013.01); *G21C 15/243* (2013.01)

(58) Field of Classification Search
CPC ...... G21C 15/243; G21C 1/322; G21C 15/02; G21C 1/326; G21C 15/14
(Continued)

(56) References Cited

U.S. PATENT DOCUMENTS 3,384,549 A * 5/1968 Deliege ................. G21C 1/322
376/406

FOREIGN PATENT DOCUMENTS

RU 2313143 C1 12/2007
RU 2690308 C1 5/2019
(Continued)

*Primary Examiner* — Jack W Keith
*Assistant Examiner* — Daniel Wasil
(74) *Attorney, Agent, or Firm* — Maschoff Brennan

(57) ABSTRACT

Embodiments of the present disclosure include an integral nuclear reactor having a core fluidly coupled to an inlet chamber and to an outlet chamber. In some instances, the nuclear reactor may include a hub to house the core, the chambers, and the protective plug. The hub may include a window allowing a heat transfer fluid to flow from the outlet chamber, through the hub, and enter an annular space between the hub and a separation shell. The heat transfer fluid may flow into an inlet of a heat exchanger. The heat transfer fluid may flow through the heat exchanger before exiting at a heat exchanger outlet. The heat transfer fluid may enter an annular delay tank before flowing down an annular downcomer duct formed by the separation shell
(Continued)

being housed in a reactor vessel. The heat transfer fluid may flow from the annular downcomer duct and into the inlet chamber.

3 Claims, 3 Drawing Sheets

(51) Int. Cl.
    *G21C 15/14*       (2006.01)
    *G21C 15/243*    (2006.01)

(58) Field of Classification Search
    USPC .......................................... 376/406
    See application file for complete search history.

(56) References Cited

FOREIGN PATENT DOCUMENTS

| WO | 2009/024854 A2 | 2/2009 |
| WO | 2009/040644 A2 | 4/2009 |
| WO | 2018/007961 A2 | 1/2018 |

\* cited by examiner

NUCLEAR REACTOR USING NATURAL AND ARTIFICIAL CIRCULATION METHODS

FIELD OF THE INVENTION

Both of the claimed invention embodiments relate to nuclear technology and can be used in reactors with different types of heat transfer fluids with a high boiling point, such as, for example, liquid metals, molten salts, etc.

PRIOR ART

The prior art discloses a nuclear power plant according under patent No. RU 2313143 with a date of priority of 20 Jun. 2006 containing a reactor with a liquid-metal reactor activator or its alloys placed under the free heat carrier level, an active zone, steam generators (SG) and circulation equipment, e.g. an axial pump, as well as a blanket gas system. Design and principle of operation of a nuclear power plant being an analogue of the claimed invention are as follows. Steam generators and pump are installed under the free heat carrier level in the annular duct located above the reactor core. Inner diameter of the annular duct is larger than the outer diameter of the core. Steam generator inlet is connected to the heat carrier volume above the core. Steam generator outlet is connected to the inlet suction chamber of the pump in the annular duct. Pressure chamber of the pump is connected via a downcomer region with the nuclear power plant core. Nuclear power plant operates as follows. Heat carrier is heated in the reactor core due to heat being released during heavy nuclei fission. Heated heat carrier enters the volume above the core through operation of the pump. Heat carrier leaves this section and enters the inlet sections of the steam generator sections, washes the steam generator tubes under the free heat carrier level and transfers heat to the working medium circuit. Heat carrier leaves the outlet sections of the steam generators and enters the suction chamber of the pump. The pump transfers energy to the heat carrier flow which is consumed to overcome hydraulic resistance of the downcomer region and the core, as well as to raise the free heat carrier level in the inlet sections of the steam generators that equals hydraulic resistance of the inlet sections of the steam generators towards the suction nozzle of the pump. Cooled heat carrier flow leaves the pressure chamber of the pump and enters the core through the downcomer region. Disadvantage of this technical solution consists in low reliability of the plant, which manifests itself in case of a failure of one of the pumps connected in parallel to the common downcomer duct since a significant return heat carrier flow will go through the pump that has shut down, which will drastically reduce its flow through the core and cause the need to significantly reduce the reactor power. In addition, in case of a failure of one of the SG sections due to a loss of containment of one of the tubes and the SG shutdown, a hot heat carrier flow will pass through the SG section that has shut down through the secondary circuit, and this flow—when mixed with the flow of cold heat carrier out of the SG section still in operation—will cause large temperature pulsations of the heat carrier that reach the core, thus reducing its performance due to thermal cycle fatigue of its structural materials. Disadvantage of this technical solution also consists in the fact that it is impossible to remove residual heat during the refueling operation, if the refueling process requires removal of the protective plug from the reactor not shown in the drawings to the patent that is necessary to reduce the radiation dose rate in the upward direction when the heat carrier level can drop below the SG and heat dissipation stops.

The prior art also discloses a nuclear reactor with a liquid-metal heat carrier equipped with at least one compact heat exchanger, in particular, a steam generator arranged vertically in the annular cavity between the reactor vessel and the coaxial annular hub, with the core and the hot heat carrier chamber of the primary circuit (WO 2009/024854)—also being an analogue of the claimed invention—located in its bottom section. Heat exchanger has a many heat exchange tubes in the form of flat spirals located one above the other. A circulation pump is inside the heat exchanger (steam generator). Hot heat carrier is supplied to the pump inlet from below and then moves upward through the pump duct in the heat exchanger, enters the heat exchanger tube bundle in the radial direction away from the heat exchanger axis toward its periphery. In addition, the nozzles connecting the hot chamber of the core with the pump inlet have guides that improve the hydrodynamics of the heat carrier flow and mechanical dampers that isolate the heat carrier flow into the heat exchanger in the event of an emergency shutdown of the pump when the heat carrier flow is reversed.

Prototype of the invention according to both embodiments claimed consists in a nuclear reactor with a similar arrangement of equipment in the reactor vessel, just like in the previous patent, a similar design of the heat exchanger (steam generator), and the same heat carrier circulation pattern of the primary and secondary circuits (WO 2018/007961), as shown in the drawings to the patent. This nuclear reactor has no hydraulic units equalizing the velocity field and moving mechanical dampers in the pipes connecting the hot chamber of the core with the pump inlet, and it has other differences in terms of its design that do not affect the choice of the nuclear reactor according to patent WO 2018/007961 as a prototype of the inventions claimed.

This reactor has a number of disadvantages. Pump impeller and the upper part of the pump where the bearing is located are washed by the hot heat carrier of the primary circuit, which complicates the design of a pump with a long service life due to a decrease in the corrosion and erosion resistance of the pump impeller material with an increase in the heat carrier temperature. Disadvantage of the prototype also consist in the fact that in the event of a leak in the steam generator tube, the egress of steam from the heat carrier into the gas cavity of the reactor due to the design features of the reactor is hindered since the heat carrier, as it leaves the steam generator, flows downward and carries steam bubbles with it. In addition, the number of pumps in the prototype is always equal to the number of heat exchangers, which may not be optimal and will lead to a deterioration of the technical and economic features. Due to the design features of the prototype, it is not possible to cool down the core during fuel discharge operations, if the discharge process provides for removal of the protective plug from the reactor before that, which leads to a decrease in the heat carrier level in the reactor and a potential circulation circuit break. One of the main disadvantages of the prototype which makes it impossible to create a nuclear reactor with the minimum possible metal consumption and better technical and economic features consists in an inefficient use of the intercontainment space with the heat exchangers (steam generators), between the reactor vessel and the coaxial annular hub.

DISCLOSURE OF THE INVENTION

The task which the creation of the group of the inventions claimed aims to solve is to improve the design of a nuclear reactor in order to reduce metal consumption and improve the technical and economic features, its reliability and safety.

General technical results achieved by implementation of both of the claimed embodiments of the invention consists, in particular, in improvement of the technical and economic features through a decrease in metal consumption of the reactor achieved through the efficient use of the internal volume of the reactor when the heat exchanger (steam generator) is placed in the annular space between the reactor vessel and the coaxial hub; better safety in case of the heat exchanger (steam generator) tube leaks when using heavy liquid metals (lead, lead—bismuth) as heat carriers throught the heat carrier flow circuit in which the direction of the heat carrier velocity vector in the heat exchanger (steam generator) coincides with the direction of the velocity vector of the rising steam bubbles, thus ensuring their efficient gravity separation into the gas cavity at the free heat carrier level; enabling the removal of residual heat during the period of time after the removal of the protective plug before the fuel discharge if the fuel discharge process provides for removal of the protective plug before this, which causes a decrease in the heat carrier level in the reactor and the circulation circuit break.

The essence of the invention claimed according to the first form is as follows.

Integral nuclear reactor with a circulating heat transfer liquid with a high boiling point contains a core with inlet and outlet chambers above and below the core, a protective plug, and a heat exchanger located under the heat carrier level in the annular space between the hub with the core inside it, inlet and outlet chambers, and the protective plug, and a separation shell inside the vessel which forms a downcomer annular duct and separates the downward cold heat carrier flow from the hot upward one. Heat exchanger is a coil one sectioned in the secondary circuit heat carrier so that the tubes of the heat exchanger sections are grouped in the inlet and outlet chambers of the secondary circuit heat harrier on the pipes on the reactor head. Heat exchanger bottom is located above the windows in the hub which the hot heat carrier flows from the outlet chamber of the core towards the inlet of the heat exchanger through. Cold heat carrier from the heat exchanger top enters the annular delay tank with the heat carrier level under the reactor head which it enters the downcomer annular duct and then into the inlet chamber of the core from.

FIG. 1 shows the design of the integral nuclear reactor corresponding to the first form which implements the principle of natural circulation of the primary heat carrier circuit.

As shown in FIG. 1, the integral nuclear reactor contains vessel 1, core 2 with outlet chamber 3 and inlet chamber 4 above and below core 2, protective plug 5, and heat exchanger 6 (steam generator). Technical result claimed is achieved by the fact that annular space 7 between hub 8 with core 2, outlet chamber 3 and inlet chamber 4, and protective plug 5 of the reactor and separation shell 9 separating the downward heat carrier flow through annular downcomer duct 10 between reactor vessel 1 and separation shell 9 from the hot upward heat carrier flow has a coil heat exchanger (steam generator) 6 sectioned along the secondary heat carrier circuit, with its axis coinciding with the axis of reactor vessel 1. Heat carrier is circulated through gravitational convection. Hot heat carrier is supplied through windows 11 in hub 8 from the outlet of core 2 towards the inlet of heat exchanger 6. Bottom of heat exchanger 6 is above windows 11. Annular space 7 also has radiation shielding units 12 which reduce the neutron radiation dose on reactor vessel 1 down to its permissible values and reduce induced radioactivity of the secondary circuit heat carrier down to its permissible values. Downcomer annular duct 10 is connected to annular delay tank 13 under the level of heat carrier 14 from above. Dynamic pressure of natural circulation is created by the differential of density of the heat carrier in the cold downcomer annular duct 10, in which the temperature of the heat carrier is constant in terms of its height, and density of the heat carrier at the mid-level of its height in the upward flow where temperature first increases due to the heating of the heat carrier in core 2; downstream is a section between the heat carrier outlet from core 2 and the inlet into heat exchanger 6 with a constant heat carrier temperature that equals to its temperature at the outlet of core 2; downstream is a section in the heat exchanger where temperature drops to the temperature of the heat carrier at the inlet of core 2. Cold heat carrier leaves heat exchanger 6 directly into annular delay tank 13 with the level of heat carrier 14, with inert gas under a slight overpressure above it. Heat carrier flows from annular delay tank 13 through the top edge of separation shell 9 into downcomer annular duct 10 and then into inlet chamber 4 of core 2, thus closing the natural circulation circuit. Heat exchanger 6 is sectioned along the secondary heat carrier circuit, so that the tubes of heat exchanger sections 15 are grouped in inlet chamber 16 and outlet chamber 17 of the secondary heat carrier circuit on pipes 18 on reactor head 19, so that in case of a shutdown, the valves of one of sections 15 of heat exchanger 6, the tubes of which have lost their containment, maintain a uniform temperature distribution of the heat carrier at the heat exchanger outlet. Tubes from different coiling rows are arranged along the radius in each of the inlet and outlet chambers of the secondary heat carrier circuit for this purpose. This prevents any significant temperature pulsations of the heat carrier reaching core 2 when the hot and cold heat carriers mix, which increases the reactor survivability. To cool down core 2 during fuel discharge operations if removal of protective plug 5 is required for this and the heat carrier level drops below the level of the heat carrier overflow through separation shell 9, separation shell 9 has windows 20 at the respective height below the heat carrier level after removal of protective plug 5 that are closed during normal operation with bypass valves 21 in downcomer annular duct 10, have actuators 22 on reactor head 19, assist opening of bypass valves 21, thus closing the natural circulation circuit and removal of residual heat through the section of heat exchanger 6 below the level of the heat carrier in the reactor after removal of protective plug 5 during fuel discharge operations.

Technical result achieved by implementation of the invention according to the second form claimed consists—in addition to the above—in enabling operation of the nuclear reactor at reduced capacity in the event of a failure of at least one of the heat exchanger sections; improved reliability of the pump and equipment on the reactor head, e.g. CPS mechanisms, through heat carrier circulation in the reactor where cold heat carrier is supplied to the annular delay tank with a free heat carrier level, as well as the best conditions for gravity separation of steam bubbles in the case of the best conditions for the gravitational separation of steam bubbles in case of SG tube leaks since the velocity vectors of the heat carrier flow and rising steam bubbles are upwards.

The essence of the invention claimed according to the second form is as follows.

Integral nuclear reactor with a heat transfer liquid with a high boiling point contains a core with inlet and outlet chambers above and below the core, a protective plug, and a heat exchanger located under the heat carrier level in the annular space between the hub with the core inside it, inlet and outlet chambers, and the protective plug, and a separation shell inside the reactor vessel which forms a downcomer annular duct and separates the downward cold heat carrier flow from the hot upward one, as well as circulation equipment, e.g. at least one circulation pump. Heat exchanger is a coil one sectioned in the secondary circuit heat carrier so that the tubes of the heat exchanger sections are grouped in the inlet and outlet chambers of the secondary circuit heat harrier on the pipes on the reactor head. Heat exchanger bottom is above the windows in the hub, which the hot heat carrier flows from the outlet chamber toward the heat exchanger inlet through, and the cold heat carrier from the heat exchanger top enters the annular delay tank with the heat carrier level under the reactor head. Vertical circulation pump is arranged inside the reactor vessel in such a way that the heat carrier is supplied to the pump impeller suction directly from the annular delay tank from under the heat carrier level through the windows in the pump shell and the pump duct connected to the reactor head, and the pump discharge pipe is connected to the annular downcomer duct via separation shell or a partition covering the annular downcomer duct top through the windows in the separation shell or the partition, respectively.

Figure 2:
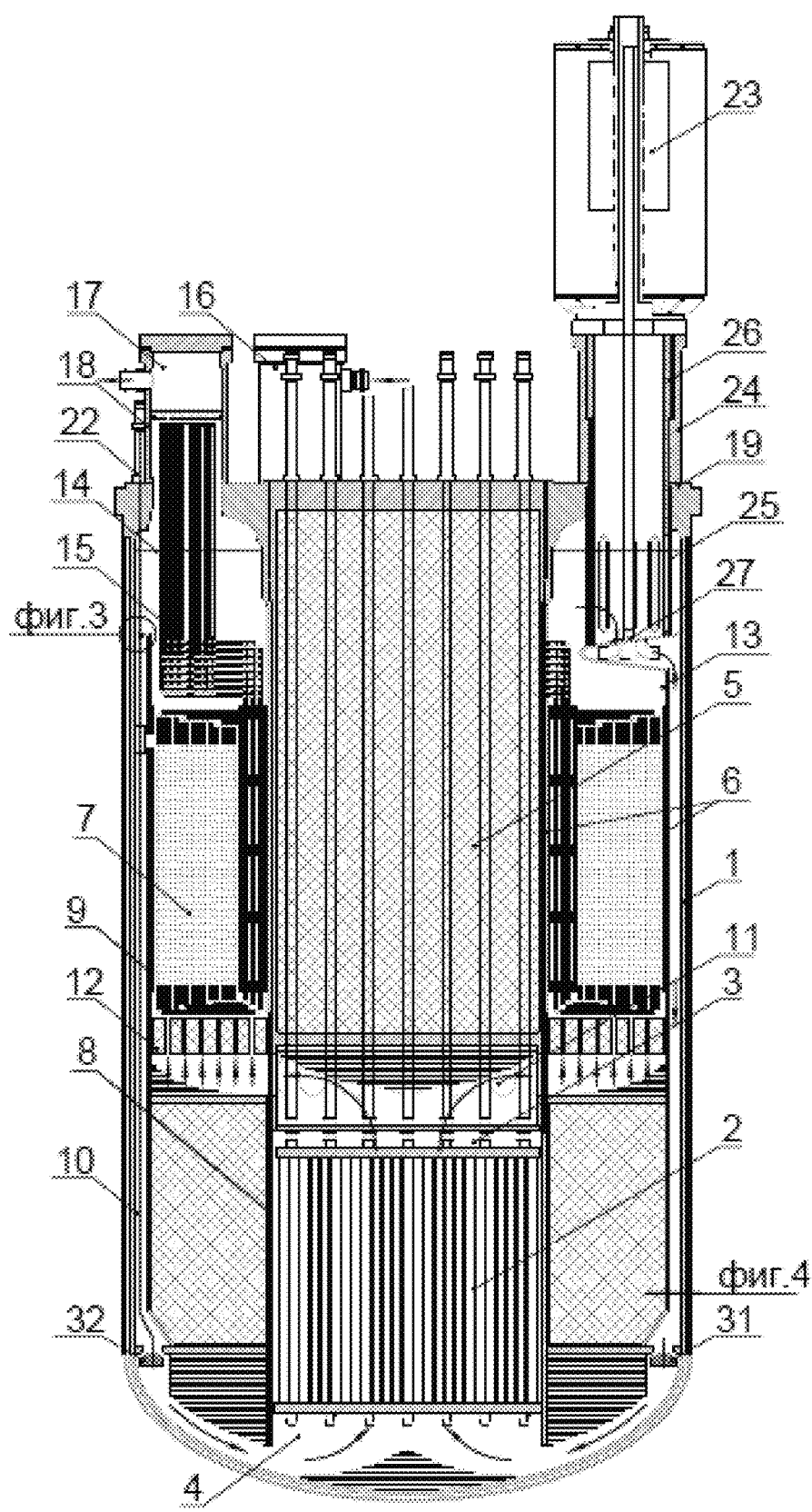
FIG. 2 shows the design of the integral nuclear reactor corresponding to the second form where the heat carrier circulates by means of the pump or pumps.
Figure 3:
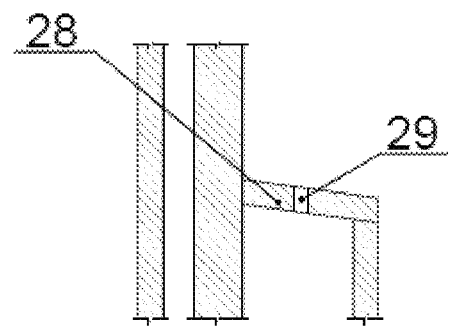
FIG. 3 shows a segment of the reactor claimed detailing the openings in the partition covering the annular downcomer duct top.

As shown in FIG. 2, the integral nuclear reactor contains vessel 1, core 2 with outlet chamber 3 and inlet chamber 4 above and below core 2, protective plug 5, and heat exchanger 6 (steam generator), and circulation pump(s) 23. Technical result claimed is achieved by the fact that annular space 7 between hub 8 with core 2, outlet chamber 3 and inlet chamber 4, and protective plug 5 of the reactor and separation shell 9 forming annular downcomer duct 10 and separating the downward heat carrier flow through annular downcomer duct 10 between reactor vessel 1 and separation shell 9 from the hot upward heat carrier flow has a coil heat exchanger 6 sectioned along the secondary heat carrier circuit, with its axis coinciding with the axis of reactor vessel 1. Hot heat carrier is supplied through windows 11 in hub 8 from the outlet of core 2 towards the inlet of heat exchanger 6. Bottom of heat exchanger 6 is above windows 11. Annular space 7 below the heat exchanger has radiation shielding units 12 which reduce the neutron radiation dose on reactor vessel down to its permissible values and reduce induced radioactivity of the secondary circuit heat carrier down to its permissible values. Cold heat carrier leaves heat exchanger 6 directly into annular delay tank 13 with the level of heat carrier 14, with inert gas under the required overpressure ensuring the required anticavitation pressure head on the pump impeller. Heat exchanger 6 is sectioned along the secondary circuit, so that the tubes of sections 15 are grouped in inlet chamber 16 and outlet chamber 17 of the secondary heat carrier circuit on pipes 18 on reactor head 19, so that in case of a shutdown, the valves of one of sections 15 of heat exchanger 6, the tubes of which have lost their containment, maintain a uniform temperature distribution of the heat carrier at heat exchanger 6 outlet. Tubes from different coiling rows are arranged along the radius in each of the inlet and outlet chambers of the secondary heat carrier circuit for this purpose. This prevents any significant temperature pulsations of the heat carrier reaching core 2 when the hot and cold heat carriers mix when the valves shut off one of the heat exchanger sections, which increases the reactor survivability. Pumps 23 are installed vertically on pipes 24, on reactor head 19, above heat exchanger 6. Heat carrier is supplied to the pump suction directly from annular delay tank 13 from under heat carrier level 14 through the windows in duct 25 and shell of pump 26 attached on reactor head 19. Pressure pipes 27 of pumps 23 are connected to inlet chamber 4 of core 2 of the reactor through the separation shell or partition 28 (see FIG. 3) covering annular downcomer duct 10 top between reactor vessel 1 and separation shell 9 through the windows in the separation shell or the partition, respectively. Partition 28 is below heat carrier level 14 in annular delay tank 13. Partition 28 has openings 29 (see FIG. 3) for release of gas when the reactor is filled with the heat carrier or steam bubbles in the event of a leak in heat exchanger (steam generator) 6 tube. Pressure pipes 27 of pumps 23 are connected to annular downcomer duct 10 through separation shell 9 on the side or through partition 28 on top.

Figure 4:
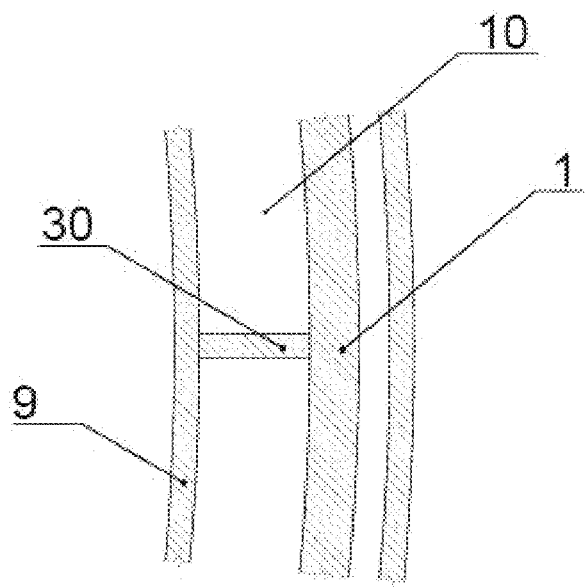
FIG. 4 shows a segment of the reactor claimed detailing the design of the annular downcomer duct with the partitions corresponding to the number of pumps in the reactor.

In addition, annular downcomer duct 10 can be split with longitudinal partitions 30 (see FIG. 4) between vessel 1 of the reactor and separation shell 9 into equal sections according to the number of pumps 23 in the reactor that join in inlet chamber 4 of core 2 (see FIG. 2).

Required number of check valves 31 can also be arranged in annular downcomer duct 10, with the corresponding part thereof closed by a reverse pressure drop if one or several pumps shut down (see FIG. 2).

Instead of the check ones, valves 32 with actuators on reactor head 19 according to the number of existing pumps 23 can be arranged in annular downcomer duct 10 that isolate the return flow of the heat carrier towards pressure pipe 27 of the pump that has shut down from the pumps in operation. There are no strict requirements for tightness of the seal when the valves are closed imposed, which facilitates its reliable movement when closing (see FIG. 2).

Figure 1:
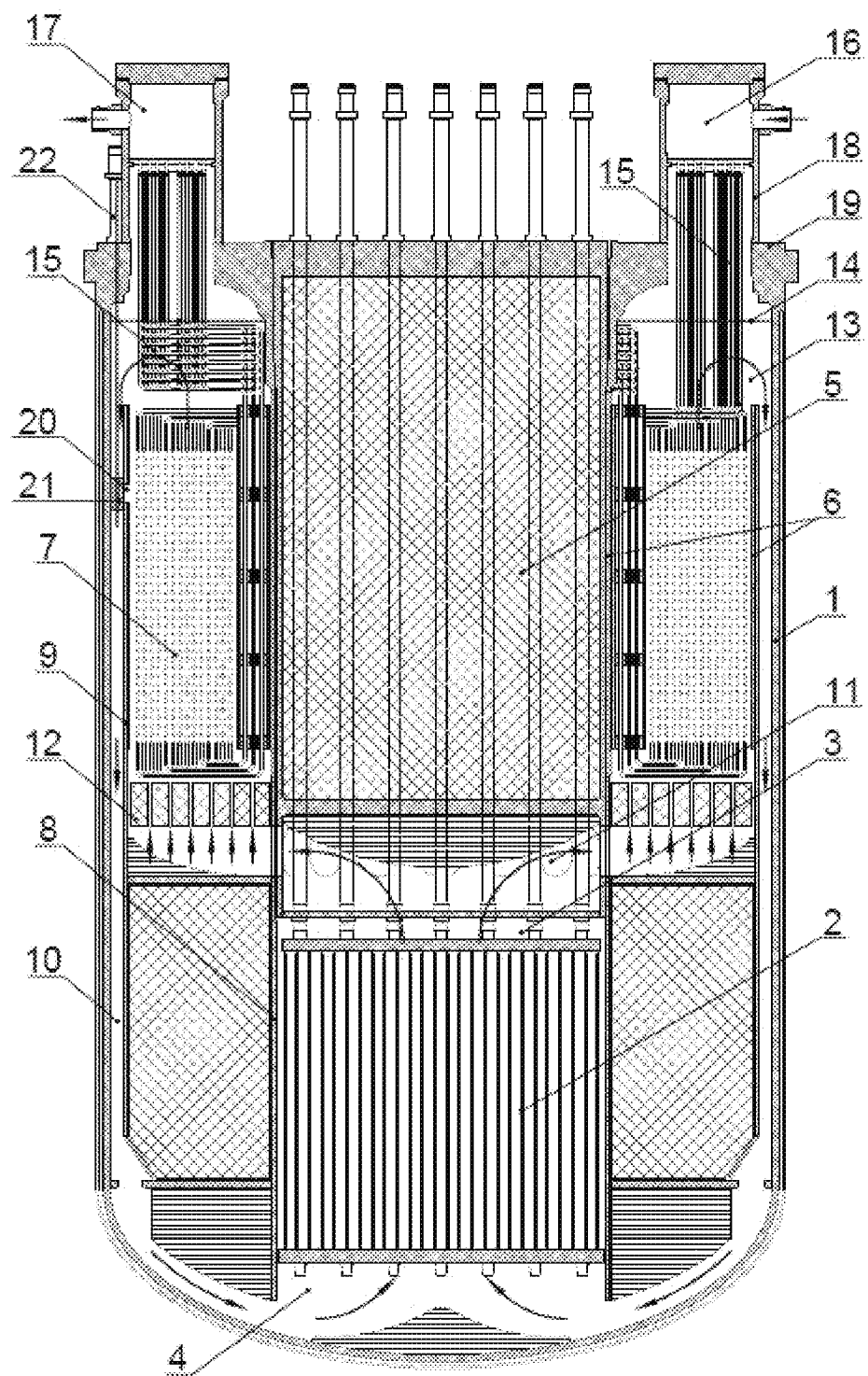

Just like with the first from of the invention claimed, in order to cool down core 2 during fuel discharge operations if this requires the removal of protective plug 5, and the heat carrier level drops below the windows in duct 25 and the shell of pumps 26 (see FIG. 2) which the heat carrier from annular delay tank 13 is supplied to the suction of the pump impellers through, windows 20 can be arranged in separation shell 10 at the appropriate height below the heat carrier level after removal of the protective plug (see FIG. 1) that are closed during normal operation with bypass valves 21 in the annular downcomer duct with actuators 22 on reactor help 19, assisting the opening of the bypass valves, thus ensuring the closing of the natural circulation circuit and removal of residual heat through the section of the heat exchanger below the heat carrier level in the reactor after removal of the protective plug during fuel discharge operations.

Nuclear reactor design as described above increases hydraulic resistance to the return heat carrier flow or prevents it completely when one or several pumps shut off and enables reactor operations at reduced capacity.

The invention claimed is:
1. An integral nuclear reactor with a circulating heat transfer liquid, the integral nuclear reactor comprising:
   a core fluidly coupled to an inlet chamber and fluidly coupled to an outlet chamber;
   a protective plug located above the outlet chamber;

a hub housing the core, the inlet chamber, the outlet chamber, and the protective plug, wherein the hub includes a window which allows hot heat carrier to flow out of the outlet chamber and through the hub;

a separation shell separating cold heat carrier from the hot heat carrier, wherein the separation shell:
  houses the hub, defining an annular space between the hub and the separation shell, and
  is located within a reactor vessel, defining an annular downcomer duct between the separation shell and the reactor vessel;

a heat exchanger located in at least a portion of the annular space, wherein the heat exchanger includes:
  a first section and a second section, the first section includes a first group of tubes at least partially located in an inlet chamber of a secondary heat carrier circuit and the second section includes a second group of tubes at least partially located in an outlet chamber of the secondary heat carrier circuit, wherein the inlet chamber of the secondary heat carrier circuit and the outlet chamber of the secondary heat carrier circuit are defined by respective pipes on a reactor head,
  a heat exchanger inlet at which the hot heat carrier enters the heat exchanger after exiting the outlet chamber of the core and through the window; and,
  a heat exchanger outlet at which the cold heat carrier exits the heat exchanger and enters an annular delay tank; wherein
    the annular delay tank is fluidly coupled to the annular downcomer duct allowing the cold heat carrier to exit the annular delay tank and flow through the annular downcomer duct and into the inlet chamber of the core.

2. The reactor according to claim 1, wherein the window is a first window and wherein the separation shell includes a second window and the annular downcomer duct includes a bypass valve which prevents flow through the window in the separation shell when closed and allows flow through the window in the separation shell when open, and further comprising an actuator of the bypass valve, which is arranged on the reactor head.

3. The reactor according to claim 1, wherein a radiation shielding unit is located in the annular space.

* * * * *